Dec. 2, 1969  G. K. JOHNSON ET AL  3,481,281
TOW TRUCK SWITCH SYSTEM
Filed April 17, 1967  3 Sheets-Sheet 1
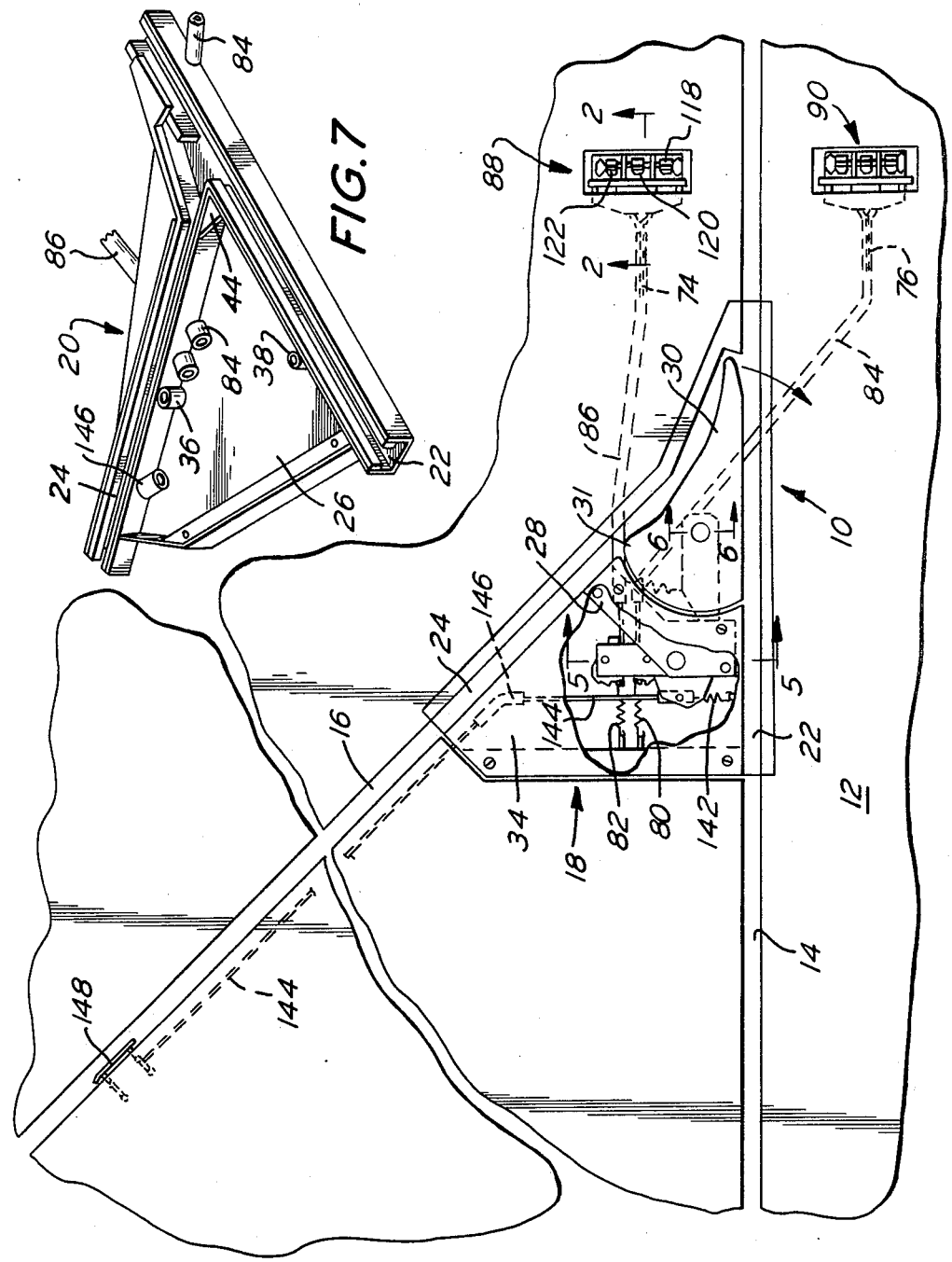
INVENTORS.
GRAHAM K. JOHNSON
PAUL R. HEFLER
BY Seidel & Gonda
ATTORNEYS.

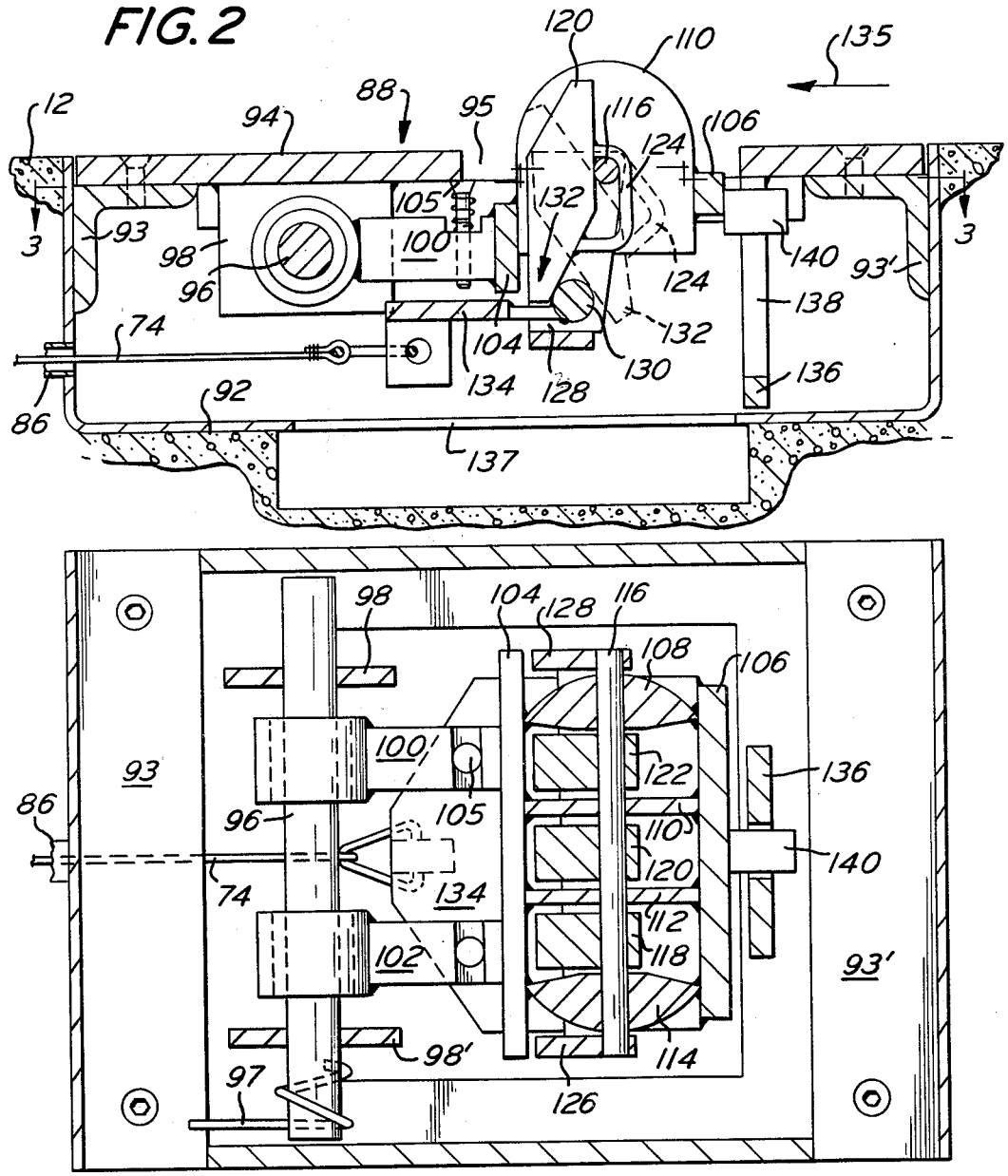

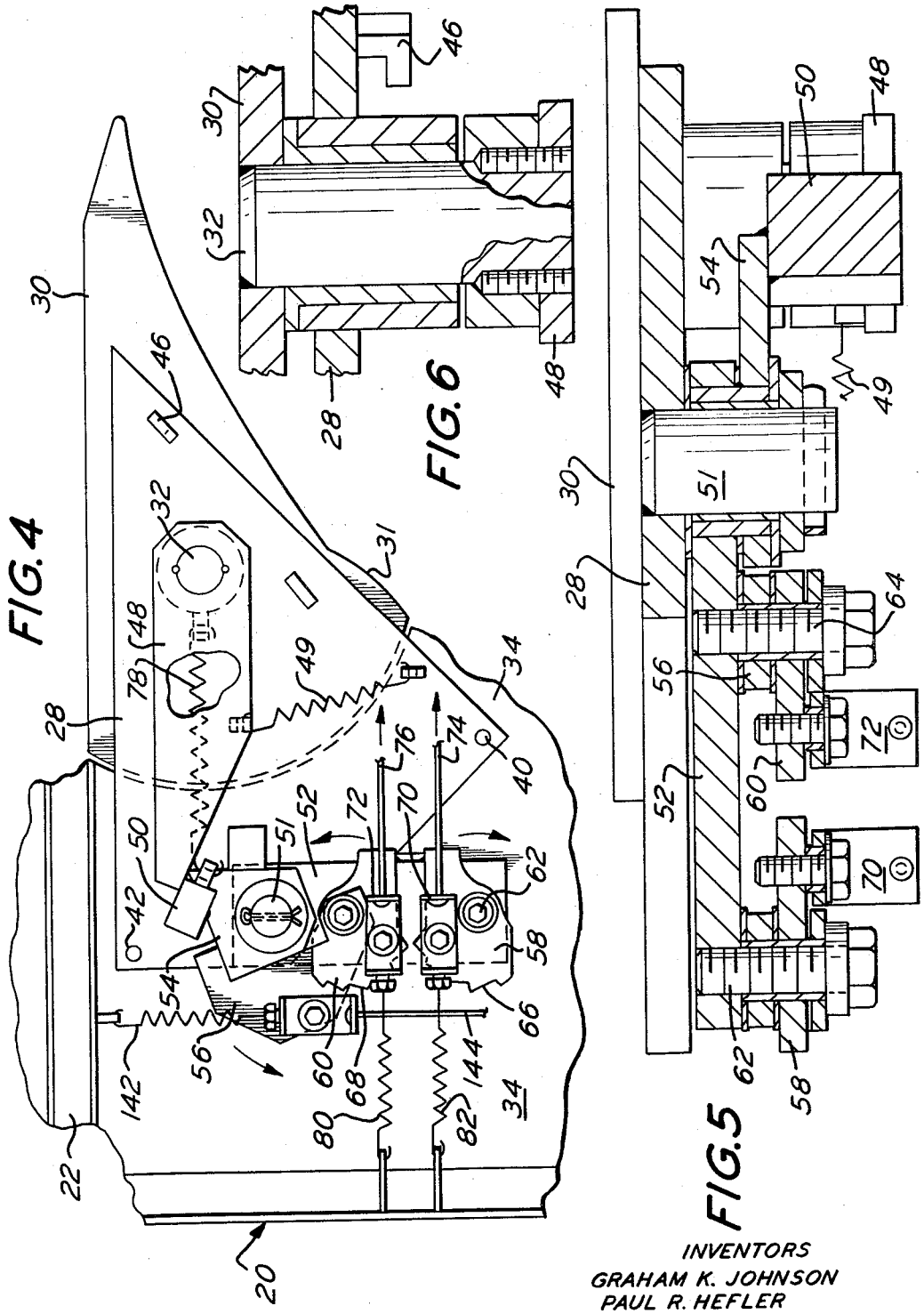

United States Patent Office 3,481,281
Patented Dec. 2, 1969

3,481,281
TOW TRUCK SWITCH SYSTEM
Graham K. Johnson and Paul R. Hefler, Easton, Pa., assignors to SI Handling Systems, Inc., Easton, Pa., a corporation of Pennsylvania
Filed Apr. 17, 1967, Ser. No. 631,363
Int. Cl. B61b *13/00;* B61k *1/00;* B61j *3/00*
U.S. Cl. 104—172                                12 Claims

ABSTRACT OF THE DISCLOSURE

A tow truck system, switch plate mechanism and treadle control mechanism for said system are disclosed. The switch plate mechanism controls the destination of trucks along the system in response to the treadle control mechanism. The switch plate mechanism is constructed in a manner to prevent introduction of debris thereinto from a tow pin slot. The treadle control mechanism is capable of selective manipulation for varying the transverse position of a treadle adapted to contact a part of a truck moving along the system and thereby change the destination of the truck while the truck is moving along the system. Two treadle control mechanisms, one on each side of the main slot, may be provided for controlling a single switch plate mechanism.

---

This invention relates to a tow truck switch system wherein driverless vehicles and/or trains of vehicles are caused to move along a main slot in a reference surface intersected by shunt slots along which the vehicles may be selectively diverted.

The main slot in systems utilized heretofore and in the present invention is open at its upper end. Debris collects in the main slot and is pushed along the main slot by the lower end of a tow pin on the vehicle. It has been found that the debris collects in the switch mechanism located at the intersection of a shunt slot and the main slot. This collected debris eventually interferes with or substantially increases maintenance on the switch mechanism. One feature of the present invention includes a switch mechanism structurally interrelated in a manner that eliminates the problem of collected debris at the switch mechanism.

Another aspect of the present invention is the particular construction of the switch mechanism which includes a novel housing, a novel switch plate actuator means within the housing, and a novel control mechanism coupled to the actuator means. The switch plate actuator means is suspended within the switch mechanism housing by the cover for the housing or a portion thereof for ease of maintenance, ease of replacement, and ease of installation.

The switch mechanism may be coupled to one or two separate control mechanisms. Where two control mechanisms are provided, they may be on opposite sides of the main slot. Each control mechanism includes at least two treadles each having an active and inactive position. In their active positions, each treadle is coupled to the actuator means for the switch plate for initiating movement of the same between an operative and inoperative position. In the operative position of the switch plate, it blocks the main slot and directs vehicles for movement from the main slot into the shunt slot.

The selective use of at least two treadles on each control mechanism provides for a variety of advantages in use of the system. Thus, each treadle may be positioned in an active or operative location so as to enable a vehicle to be switched to a shunt slot regardless of whether one or two of the treadles on a single control mechanism are activated. In addition, all of the treadles on a single control mechanism may be rendered inoperative when the system is not in use or when a particular shunt slot is being repaired or it is otherwise not desired to use a particular shunt slot. When two control mechanisms are utilized in conjunction with one switch mechanism, at least one treadle on each control mechanism must be simultaneously activated by the vehicle before the switch plate will be moved from its inoperative position to its operative position.

It is an object of the present invention to provide a tow truck switch system wherein a switch mechanism is constructed and arranged so as to prevent the accumulation of debris thereat.

It is another object of the present invention to provide a switch mechanism which requires a minimum of maintenance, while being easy to install and/or replace.

It is another object of the present invention to provide a system having a control mechanism which is flexible to the extent that either one of at least two treadles may be selectively made operative or inoperative in a facile manner.

It is another object of the present invention to provide a novel switch mechanism for use in a tow truck system responsive to treadles on opposite sides of a main slot, which treadles must be simultaneously activated by a vehicle before the vehicle can be directed to movement along a shunt slot.

It is another object of the present invention to provide a tow truck system having a novel switch mechanism responsive to simultaneous activation of a pair of treadles, wherein slight discrepancies between simultaneous activation of the treadles can be accommodated.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a partial top plan view of the system in the present invention.

FIGURE 2 is a sectional view taken along the line 2—2 in FIGURE 1.

FIGURE 3 is a sectional view taken along the line 3—3 in FIGURE 2.

FIGURE 4 is a bottom plan view of the switch plate and its associated actuating means.

FIGURE 5 is a sectional view taken along the line 5—5 in FIGURE 1.

FIGURE 6 is a sectional view taken along the line 6—6 in FIGURE 1.

FIGURE 7 is a perspective view of the switch mechanism housing.

Referring to the drawing in detail, wherein like numerals indicate like elements, there is shown in FIGURE 1 a tow truck switch system designated generally as 10. The system 10 includes a reference surface such as floor 12 having a main slot 14 which is intersected at spaced points therealong by shunt slots 16. The shunt slots 16, as is conventional in the art, may extend to either side of the main slot 14.

At the intersection of slots 14 and 16, there is provided a switch mechanism designated generally as 18. As shown more clearly in FIGURE 7, the mechanism 18 includes a housing designated generally as 20. The housing 20 is provided with upstanding walls defining a channel 22 which forms a part of the main slot 14 as shown more clearly in FIGURE 1. Housing 20 also includes a pair of upstanding walls defining a channel 24 which forms a part of the shunt slot 16 as shown more clearly in FIGURE 1. The upstanding walls facilitate isolating the channels 22 and 24 from the chamber 26 within the housing 20.

The mechanism 18 includes a cover overlying the chamber 26. The cover is generally flush with the floor 12. The cover includes a cover plate 28 which overlies a portion of the housing 20 and supports a switch plate 30. Switch plate 30 is provided with a toe movable to a position where it can obstruct the main slot 14 and cause trucks to be shunted along the slot 16. Switch plate 30 includes a cam portion 31 which will be described hereinafter. The cover includes a cover plate 34 which partially overlies the plate 28 and is in the general plane as the switch plate 30 and the floor 12.

As shown more clearly in FIGURE 6, the switch plate 30 is connected to a pin 32 rotatably supported by the plate 28. As shown more clearly in FIGURE 7, the housing 20 includes bosses 36 and 38. Plate 28 is provided with a hole 40 through which a screw may extend and be threadedly engaged with boss 36. Plate 28 is provided with a similar hole 42 through which a screw may extend and be threadedly engaged with boss 38. Housing 20 is provided with a ledge 40. A hook 46 on the lower surface of plate 28 is adapted to extend under the ledge 44 in an assembled relationship of the components.

An actuator arm is fixedly connected to the lower end of post 32 in any suitable manner such as by screws illustrated in FIGURE 6. The arm 48 is biased to the position illustrated in FIGURE 4 by means of spring 49. Spring 49 extends between the arm 48 and the plate 28. The bias of spring 49 on arm 48 is opposed by a blocking member 50. Blocking member 50 is fixedly secured to a plate member 54 which in turn is rotatably mounted about post 51 which is secured to and depends from plate 28. A plate member 52 is also pivotable about post 51.

As shown more clearly in FIGURES 4 and 5, a locking member 56 is provided. Locking member 56 is provided with a generally rectangular notch within which is received a generally rectangular portion on the plate member 54. Locking member 56 interconnects member 54 with member 52 so that they may move as a unit. When member 56 does not interconnect members 54 and 52, movement of member 52 will have no effect on movement of member 54.

A pair of latches 58 and 60 are supported from the lower surface of plate member 52. Latch 58 is supported from member 52 by means of a post 62. Post 64 supports latch 60 from the lower surface of member 52. Locking member 56 is rotatably supported about the longitudinal axis of post 64. As shown more clearly in FIGURE 4, the latches 58 and 60 are provided with serrated edges 66 and 68 respectively.

A cable mounting bracket 70 depends from the latch 58 and a cable 74 is connected thereto. A cable mounting bracket 72 depends from the latch 60 and a cable 76 is connected thereto. A spring 78 extends between the blocking member 50 and the undersurface of plate 28 thereby biasing the plate 52 to the position illustrated in FIGURE 4. Spring 80 biases the latch 60 to the position in FIGURE 4. Spring 82 biases the latch 58 to the position in FIGURE 4.

Cable 76 extends through a conduit 84 to a control mechanism designated generally as 90. Cable 74 extends through a conduit 86 to a control mechanism designated generally as 88. The conduits 84 and 86 are in a plane slightly below the bottom wall of the channels 22 and 24. The control mechanisms 88 and 90 are identical. Accordingly, only mechanism 88 will be described in detail.

Mechanism 88 is mounted in the floor 12 forwardly of the intersection of the slots 14 and 16. Mechanism 88, as shown more clearly in FIGURES 2 and 3, includes a generally cup-shaped housing 92 having a pair of angle iron brackets 93 and 93' on opposite sides thereof adjacent the upper end. A cover 94 is provided for the housing 92. Cover 94 overlies and is removably coupled to the brackets 93 and 93' by screws shown in phantom. Cover 94 is provided with a slot 95 generally perpendicular to the main slot 14.

A shaft 96 is rotatably supported by brackets 98 and 98' depending from the lower surface of the cover 94. A pair of arms 100 and 102 are connected to the shaft 96 and biased to the position illustrated in FIGURE 2 by a torsion spring 97. Any other type of spring bias could be utilized. Arms 100 and 102 rotate with shaft 96.

A first cross bar 102 is connected to the free ends of arms 100 and 102. A second cross bar 106 is connected to the first cross bar 104 by means of guards 108, 110, 112, and 114. The guards are provided with a semicircular periphery at their upper ends as shown more clearly in FIGURE 2. Guards 108 and 110 are provided with a curved outer periphery as shown more clearly in FIGURE 3. The upper extent of the guards is limited by contact between screw 105 and the undersurface of cover 94. A screw 105 is threadedly coupled to each of the arms 102 and 104. A shaft 116 is rotatably supported by the guards.

As shown more clearly in FIGURE 2, the treadle 120 is provided with a loop 124 through which the shaft 116 extends. Each treadle has a similar loop. The portion of the treadle 120, and all of the other treadles, which projects above the surface of cover 94 is within the periphery of the guards 108–114. In the operative or active position of treadle 120, as illustrated in solid lines in FIGURE 2, a toe portion 132 is in contact with a rod 130. Treadle 120 may be manually raised until the large portion of the loop 124 receives the shaft 116, thereafter the treadle 120 may be moved downwardly so that its toe portion 132 is to the right of rod 130. In the phantom position of treadle 120 in FIGURE 2, the treadle is in an inoperative or inactive position.

The rod 130 is connected at its ends to arms 126 and 128. Arms 126 and 128 are connected to the shaft 116 and act as a swing. A plate 134 is connected to the rod 130 at one end and to the cable 74 at its opposite end. Any one of the treadles 118, 120 and 122 may have an active or operative position wherein they will engage the rod 130 and move the same to the right in FIGURE 2 when contacted by a vehicle supported member moving in the direction of arrow 135. Also, each treadle has an inoperative or inactive position corresponding to the phantom position of treadle 120. The bottom of housing 92 has a hole 137 therein to facilitate pivoting the treadles and guards about shaft 96.

The guards and the treadles are adapted to pivot in a clockwise dirction about the axis of shaft 96 is subjected to a force such as being run over by the tire of a vehicle, being stepped on by a person, etc. Thus, when subjected to such a force, the treadles and the guards move downwardly into the housing 22. In order to guide such downward movement, there is provided a guide plate 136 having a guide slot 138 therein. Plate 136 is supported by the underside of the cover 94. A guide follower 140 is provided on the cross bar 106 and projects into the slot 138.

Referring to FIGURE 4, it will be noted that the locking member 56 is biased to the position illustrated by means of spring 142. A cable 144 is connected to a bracket on the locking member 56. Cable 144 extends through a conduit 146, see FIGURES 1 and 7, to an overload device 148 disclosed along the shunt slot 16. When a predetermined number of vehicles have accumulated along the slot 16, device 148 will be activated to cause cable 144 to exceed the bias of spring 142 thereby moving the locking plate 56 about the axis of post 64 to a position wherein member 56 no longer embraces member 54. When this occurs, no additional vehicles may be transferred from the main slot 14 to the shunt slot 16 until the spring 142 is permitted to return the locking member 56 to the solenoid position illustrated in FIGURE 4.

The operation of the present invention is as follows:

A vehicle such as that disclosed in Patent 3,103,895, for example, may be utilized in connection with the system 10 of the present invention. In said patent, there is provided selectively positionable trip rods 64 and 66 on opposite sides of the tow pin 44. It will be assumed that treadles 118 and 122 are inactive and therefore assume a phantom position corresponding to the phantom position of treadle 120 in FIGURE 2. It will also be assumed that one of the treadles on control mechanism 90 is active and the remainder thereof are inactive. The active treadles of mechanisms 88 and 90 will be assumed to have been preset so as to be contacted by the trip rods 66 and 64 on the vehicle disclosed in the above-mentioned patent.

Simultaneous actuation of at least one treadle on each of the mechanisms 88 and 90 causes the cables 74 and 76 to simultaneous rotate the latches 58 and 60 about their respective posts 62 and 64. The latches 58 and 60 interengage with one another at their stepped surfaces 66 and 68 and act as a unit to cause the plate member 52 to rotate counterclockwise in FIGURE 4 about the axis of post 51. In doing so, arm 48 will then clear blocking member 50 and rotate in a counterclockwise direction in FIGURE 4 due to spring 49. Since FIGURE 4 illsutrates the components in a bottom plan view, switch plate 30 will rotate in a clockwise direction in FIGURE 1 until it blocks the main slot 14. Switch plate 30 will assume this position immediately preceding the approaching tow pin which will be caused to enter the shunt slot 16. As the tow pin progresses along channel 24 of the shunt slot 16, it will contact the cam surface 31 which has been moved into the channel 24 due to rotation of the switch plate 30. The tow pin cams the switch plate 30 to the solid line position illustrated in FIGURE 1 by contact with the cam surface 31. In doing so, the switch arm 48 will push the blocking member 50 out of its way until it passes beyond the blocking member to the position illustrated in FIGURE 4 and is retained in said position.

As soon as the trip rods no longer contact the treadles, the springs 80 and 82 will cause the latches 58 and 60 to resume the position illustrated in FIGURE 4. If the shunt slot 16 is near a curve, the trip rods on the vehicles will be slightly out of phase with one another so that there is not simultaneous actuation of the treadles. A slightmisalignment of the timing will have no effect since the steps 66 and 68 will engage and interlock with one another. If a treadle on only one of the mechanisms 88 and 90 is tripped by a rod on a vehicle, such as treadle 120, latch 58 will be caused to rotate about the axis of its post 62 without causing the plate member 52 to rotate about the axis of post 51. Hence, the arm 48 will never be permitted to clear the blocking member 50.

In connection with the above, it was assumed that the blocking member 56 was coupled to the member 54. If more than a predetermined number of vehicles have accumulated along the slot 16, cable 144 will have been tensioned so as to overcome the bias of spring 142 and thereby rotate the locking member 56 about post 64 so as to be out of engagement with member 54. When this occurs, actuation of either or both of the latches 58 will have no effect on movement of the switch plate 30. Thus, it will be noted that locking member 56 is a link interconnecting plate members 52 and 54. In the absence of such interconnection, actuation of the treadles can have no effect on the switch plate 30.

Any debris in the main or shunt slots pushed by the tow pin cannot enter the housing 20. Hence, the actuating means within chamber 26 is free from any debris in the main or shunt slots. It will be noted that the actuating means is supported by the cover for the housing 20. As will be apparent from FIGURE 2, all of the elements and components of the control mechanism are supported by the cover. Hence, maintenance, installation and repair can be readily accomplished by removing the cover and all elements associated therewith are automatically removed at the same time.

If it is desired to perform any repairs along shunt slots 16, or it is otherwise desired not to cause any trucks to enter shunt slot 16, it is only necessary to selectively position all of the treadles so that they assume an inoperative position corresponding to the phantom position of treadle 120 in FIGURE 2. Normally the combination of treadles and trip rod positions necessary to cause a vehicle to be switched from movement along the main slot to a particular shunt slot is permanently fixed when the system is installed. As will be apparent from the present disclosure, the selectively manipulative treadles facilitate changing the combination for a particular shunt slot at will. This stems from the fact that any one of the treadles 118, 120 or 122 can be utilized to activate cable 74.

In a small tow truck system where there are a small number of shunt slots, such as less than twenty shunt slots, it would not be necessary to have a pair of control mechanisms on opposite sides of the main slot such as that illustrated in FIGURE 1. Thus, it would be possible to have only a single control mechanism for controlling the operation of the switch plate. Thus, if mechanism 90 were eliminated and cable 74 connected directly to switch plate 52, the advantages of a selectively variable control mechanism would still apply. Thus, the features of the control mechanisms 88 and 90 have applications in other types of systems wherein it is neither necessary nor desirable to require simultaneous actuation of two control mechanisms in order to effect a transfer of movement of the vehicle from the main slot to a shunt slot.

The guards associated with the various treadles prevent inadvertent actuation of the treadles. Thus, the treadle will not be actuated if the mechanism is run over by the vehicle of the fork lift truck or stepped on by human beings. Any force applied to the mechanism will merely cause the treadles and guards to pivot about the axis of shaft 96, enter hole 137, and thereafter return to the position shown under the effect of the torsion spring 97. The provision of hole 137 enables the housing 92 to be made shallow and still accommodate such pivotable movement. The desirability of this feature is disclosed in greater detail in Patent 3,261,300 which is believed to be the closest prior art. In view of said patent, a more detailed explanation of the operation of the switch mechanism is not deemed necessary.

The present invention may be emboddied in other specific forms without departing from the spirit or essential attributes thereof and, accordingly, reference should be made to the appended claims, rather than to the foregoing specification.

It is claimed:

1. A tow truck system comprising a floor having a main slot, shunt slots intersecting the main slot, a switch plate mechanism at the intersection of said slots, said mechanism having upstanding walls defining intersecting U-shape channels, one channel being part of said main slot, the other channel being part of said shunt slot, said mechanism having an interior chamber, some of said walls isolating said chamber from said channels so that debris in said channels cannot enter said chamber, a cover for said chamber including a movable switch plate, said switch plate controlling access to said shunt slot from said main slot, actuator means in said chamber connected to said switch plate for selectively moving said switch plate, and a control mechanism forwardly of the intersection of said slots for actuation by a member supported by a vehicle, said control mechanism being coupled to said actuator means.

2. A system in accordance with claim 1 wherein said control mechanism includes at least two treadles, means supporting each treadle for movement between an operative and an inoperative position, either treadle in its operative position being capable of initiating actuation of said switch plate, each treadle being selectively positionable to its inactive position, and said treadles being side by side.

3. A system in accordance with claim 1 wherein each treadle is provided with a loop having varying transverse dimension with a shaft extending through the loop of each treadle, whereby each treadle may be raised and then lowered to an inactive position.

4. A system in accordance with claim 1 wherein said actuator means is suspended from a portion of said cover, and removable therewith, said control mechanism including a treadle mounted for movement about a horizontal axis, said treadle being supported by a cover for the control mechanism for removal therewith.

5. A system in accordance with claim 1 including a pair of control mechanisms on opposite sides of the main slot, each control mechanism being coupled to a portion of said actuator means, said actuator means being constructed in a manner so as to require simultaneous actuation of a treadle on each control mechanism before initiating movement of said switch plate.

6. An article of manufacture for use in a tow truck switch system comprising a switch mechanism housing having a removable cover overlying a chamber therewithin, said housing having upstanding walls defining intersecting U-shape channels, one channel being adapted to form a part of a main slot, the other channel being adapted to form a part of a shunt slot, said chamber being isolated from said slots by said upstanding walls, said cover supporting a switch plate adapted to control entry from said one channel to said other channel, and at least one conduit passing beneath the floor of one of said channels, said conduit terminating in said chamber.

7. An article of manufacture for use in a tow truck system comprising a control mechanism having at least two treadles projecting above floor level and mounted for movement below floor level, the improvement comprising a common shaft for said treadles, said treadles being pivotable about said shaft, a plate member, a cable connected to said plate member, each treadle having an operative position wherein it is coupled to the plate member for causing movement of the same as it pivots about its shaft, and means for moving each treadle to an inoperative position wherein it is incapable of moving said plate member, whereby the treadles may be positioned so that either one will activate the plate member, only one will activate the plate member, or neither will activate the plate member depending upon whether the treadles are in their operative or inoperative positions.

8. An article of manufacture in accordance with claim 7 wherein each treadle member is provided with a loop, said shaft extending through the loop on each treadle member, each loop being of sufficient size so that the treadle member may be raised or lowered with respect to the shaft, each treadle being pivotable with respect to said shaft in its raised or lowered position, whereby the lower end of each treadle may be in abutting contact with a portion of said plate member in its operative position and out of contact with a portion of said plate member in its inoperative position.

9. A tow truck system comprising a floor having a main slot, a shunt slot intersecting the main slot, a switch mechanism at the intersection of said slots, said mechanism including a switch plate controlling movement from the main slot to the shunt slot, an actuator means coupled to said switch plate for causing movement of the switch plate, a control mechanism connected to said actuator means by means of a flexible member, said control mechanism including at least two treadles, means supporting each treadle so that it may be rendered inoperative, each treadle being independently capable of operating said actuator means, and said control mechanism being supported forwardly of the intersection of said slots for contact with an element on a vehicle moving along the main slot.

10. A system in accordance with claim 9 wherein said actuator means includes an arm fixedly connected to the switch plate, a blocking member preventing rotation of the arm, a plate member coupled to the blocking member by means of a locking member, a pair of latches pivotably supported on the plate member, said latches contacting one another only when the latches are simultaneously actuated, such simultaneous actuation of the latches causing pivotable movement of the plate member which in turn causes pivotable movement of the blocking member to a position wherein it no longer blocks the arm, and spring means biasing the arm to cause rotation of the same which in turn will cause rotation of the switch plate.

11. An article of manufacture for use in a tow truck system wherein tow trucks moving along a guide slot are to be diverted to a shunt slot by a switch plate comprising a control mechanism for controlling the position of a switch plate, said mechanism having a removable cover, said cover having an opening, means in the housing supporting a plurality of treadles for movement between an operative and inoperative position, in the operative position the treadles extending through said opening, an actuator for a switch plate, said actuator being partially disposed in said housing, said actuator including a horizontal member operatively contacted by each of the treadles only when said treadles are in their operative position.

12. An article of manufacture in accordance with claim 11 wherein said treadles are mounted for movement in an upright direction with the upper end of the treadles being at a higher elevation in their operative position as compared with the upper end of the treadles in their inoperative position.

References Cited
UNITED STATES PATENTS 3,406,638   10/1968   Braur _____ 104—88

DRAYTON E. HOFFMAN, Primary Examiner

U.S. Cl. X.R.

104—88, 130